W. HENIGST.
Cultivator.
No. 207,808.    Patented Sept. 10, 1878.
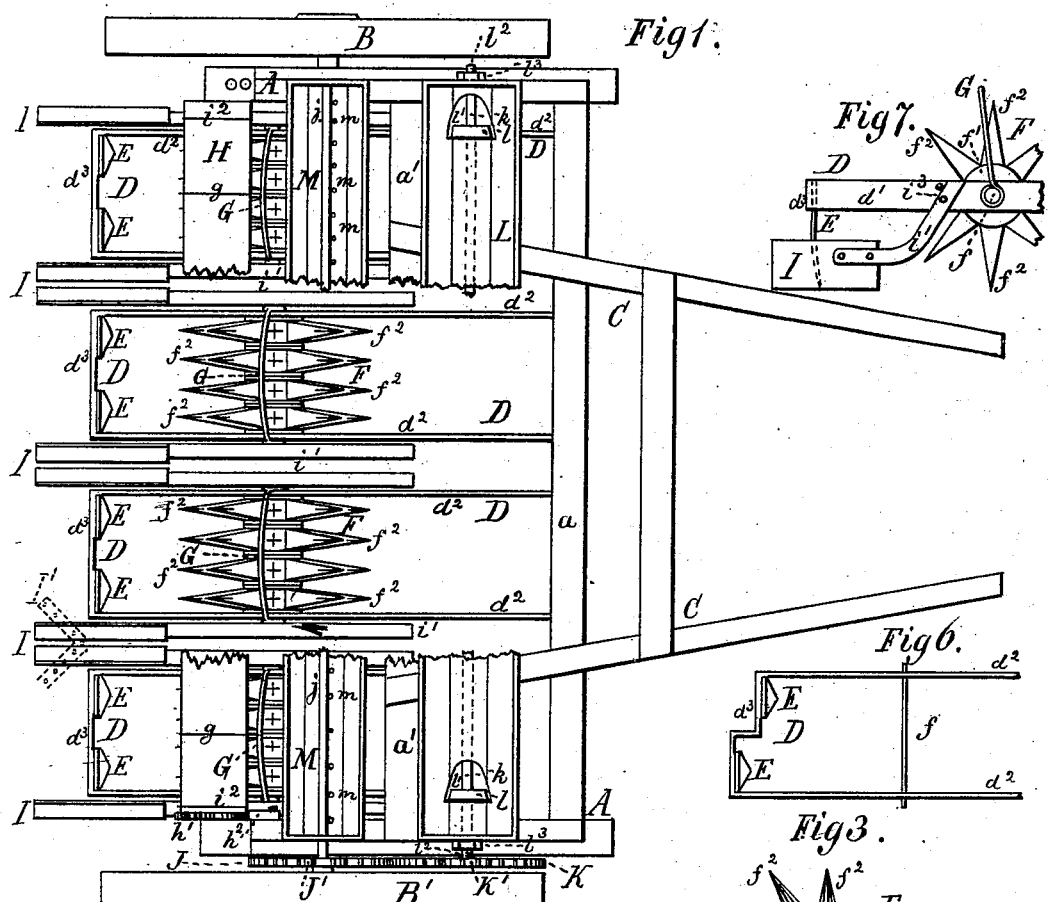
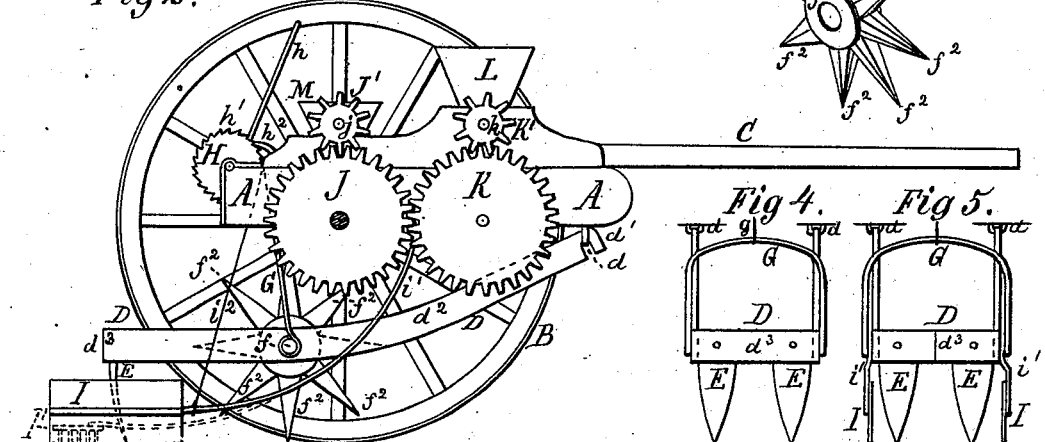
Witnesses:
J. P. Theodore Lang
C. A. Didden
Inventor:
William Henigst
by
Mason, Fenwick & Lawrence
Attorneys.

UNITED STATES PATENT OFFICE.

WILLIAM HENIGST, OF COLUMBUS, OHIO.

IMPROVEMENT IN CULTIVATORS.

Specification forming part of Letters Patent No. 207,808, dated September 10, 1878; application filed March 30, 1878.

*To all whom it may concern:*

Be it known that I, WILLIAM HENIGST, of Columbus, in the county of Franklin and State of Ohio, have invented a new and useful Improvement in Cultivators for Wheat, Rye, Oats, Barley, and other similar small grain; and I do hereby declare that the following is a full, clear, and exact description of the same, reference being had to the accompanying drawings, forming part of this specification, in which—

Figure 1 is a plan view of my improved cultivator, with a portion of it broken away in order to fully expose the lower parts. Fig. 2 is a side elevation of the same, one of the driving-wheels being removed in order to expose the parts which would be hidden by it. Fig. 3 is a detail view of one of the vertically-revolving pointed cutter-wheels used in my machine. Fig. 4 is an end view of one of a series of oblong swinging frames, in which the revolving pointed cutter-wheels are hung, and to which cultivator-blades are attached in rear of the said cutter-wheels. In this figure the wheels are removed and the blades shown attached. Fig. 5 is a modification of one part of my machine, as hereinafter explained. Fig. 6 is a top view of the same. Fig. 7 is a side view of the same, the revolving cutter-wheels being shown in place, and a bail for lifting the frame represented. Fig. 8 shows a broken vertical longitudinal section of a fertilizer-distributing attachment used on my machine.

My invention is designed especially for cultivating young grain-plants, such as wheat, for planting clover or grass seed, and for distributing the fertilizing agents upon the soil or about the plants, and for cultivating the soil for small grain and seeds.

Heretofore it was generally the custom to sow wheat, either broadcast with the hand or with a grain-drill, in rows from five to eight inches apart, and then to leave it until the harvest-time arrived; and under this mode of raising grain-crops a gradual falling off of the yield has been experienced in this country, while in Great Britain this has not been felt so heavily, from the simple fact that it is customary in that country to stir up the planted soil in the spring of the year with a small or common horse-hoe.

To restore the yield of grain-growing crops to the maximum extent is the object of my invention, the nature of which consists in certain constructions, combinations, and arrangements of parts, hereinafter fully described and specifically claimed, whereby a wheat or other small-grain cultivator is produced which is well adapted for cutting up and preparing the soil of fields for such small grain as is planted in drills or sown broadcast, but especially adapted for cultivating the rows of young growing grain-plants, without liability of their heads being covered up or of their roots being left exposed, or the plants in any manner being injured, while at the same time the weeds about the plants can be more effectually destroyed and left in a condition for being raked off by a rake forming an appendage to the machine, or made separate therefrom, and whereby clover-seed and fertilizing agents can be distributed when the machine is not specially in use for cultivating the young grain-plants, or not in use for preparing the soil therefor, or for sowing seed; and when fertilizing agents are distributed or clover-seed being planted, the cultivator-blades and revolving pointed cutter-wheels of the machine are made to answer for turning in or throwing the finely-divided soil upon the same.

In the drawings, A represents a suitable frame; B B', supporting-wheels, and C the shafts, of my machine. The front bar, $a$, of the frame A is provided with a number of staples, $d$, on its under side, into which the hooked ends $d^1$ of a series of iron frames, D, are so secured that they cannot be disengaged while in their normal position, and for their disconnection from the staples must be adjusted or moved to a vertical position with respect to the frame A. Each of the frames D is made of a flat bar bent at right angles, so as to form two parallel arms, $d^2$, and a transverse connection, $d^3$. To the parts $d^3$ of the frames cultivator-blades E are fastened, two blades for each frame being a suitable number in the most ordinary cases. In Figs. 1, 2, 4, and 7, the blades are shown in the same transverse line; but these blades have been found to work well arranged in steps, or one in advance of another, as shown in Figs. 5 and 6. In front of these blades E the frames D are provided with cultivator-wheels F, which are arranged loosely on shafts $f$ of the frames D, each set or series of wheels having an independent shaft, which is secured to the arms $d^2$ of the respective frames, as seen in the drawings. The said wheels F are respectively made with a hub, $f^1$, and a number of pointed or sharpened arms, $f^2$, and presents the form of a star; and they are made heavy, so as not only to enter the ground by reason of their own weight, but also in order that they shall cause the cultivator-blades E to do so to the extent deemed necessary. At a suitable point, generally at the extended ends of the respective shafts $f$ of each of the frames D, a bail, G, is attached to each of the frames D, and cords or chains $g$ connect the bails with a windlass, H, suitably hung to the frame A. The windlass H is provided with a hand-lever, $h$, a ratchet-wheel, $h^1$, and pawl $h^2$, or other suitable retaining devices. By means of the windlass the cultivator-blades and the revolving cutter-wheels and their frames can instantly be lowered, so as to act with their whole weight upon soil which is very hard, and in soils which are loose or moderately hard these parts can be suspended, so as to act with less weight or force, thus lessening the strain when not required.

Behind the bar $a$ the frame A is provided with another bar, $a^1$, to the lower side of which the arms $i^1$ of a number of side guards or shields, I, are suitably pivoted. These shields I are arranged in pairs, one to the right and the other to the left of the space between each pair of frames D, and directly opposite the side edges of the cultivator-blades E of the frames D, so that the earth plowed or turned up near the blades E shall be prevented from rolling into the central space between the frames D, and covering the young grain-plants. The shields I are connected to the windlass by cords or chains $i^2$, which are fastened to the arms $i^1$ of the shields.

In Figs. 5 and 7 is shown a modification of the device for attaching or hanging the shields so that they shall be raised with the frames D by the windlass. In this plan the shields are attached to the frames D by means of pins $i^3$, around which the shields have a limited swinging movement, and when the frames are lifted the shields are raised along with them.

In Figs. 1 and 2 a small triangular rake, I', is shown in dotted lines, which may be used instead of the shields I in case the ground is encumbered with weeds, and the young grain-plants are not sufficiently high to be materially injured by being combed over by the rake. When this rake is used it is hung in the same manner as the shields are hung, and a rake takes the place of each pair of shields between the frames D, and this rake can be raised and lowered by the windlass by the same connections and in the same manner as in the case of the use of the shields.

By having the revolving pointed cutter-wheels F applied in separated series on short independent shafts in a series of frames, D, each one of the series of cutter-wheels, with the frame D thereof, can accommodate itself to unyielding inequalities of the ground under cultivation in an upward direction to an unlimited extent, and in a downward direction to the extent required, when the soil does not offer such unyielding resistance as would prevent the entrance of the cultivator-blades and cutter-wheels therein; and this accommodating of the parts mentioned is secured in one frame independently of another, while the whole series of frames D may be raised at once by the windlass when necessary.

In case it should be desirable to fertilize the cultivated ground, it can be accomplished by the following means: On one of the driving-wheels B' a driving-gear, J, is applied, and this gear meshes with an intermediate wheel, K, suitably hung to the frame A, and with a pinion, K', on a shaft, $k$, which revolves beneath the bottom of a hopper, L. This shaft is provided with conical grinding-wheels $l$, which are about half surrounded by inclined spouts $l^1$, formed on the bottom of the hopper, so as to be in communication with its inside, and open for the discharge of the fertilizer in a gradual manner.

The diameter of the conical wheels is a little less than the diameter of the circle which would be formed if the spouts were made in form of a complete cone, and thus a space is allowed between the wheels and the spouts for the fertilizer to pass out of and drop upon the ground.

The shaft $k$ is provided at each end with a screw-thread, $l^2$, and a nut, $l^3$, by means of which it may be adjusted longitudinally, and the peripheries of the wheels $l$ thereby caused to stand closer to or farther from the spouts $l^1$, accordingly as it is required to distribute the fertilizers.

The fertilizers to be used in my machine are already ground; but from various causes they become compacted and lumpy; hence the grinding or pulverizing wheels $l$ are required to separate the particles and insure the discharge of the fertilizers from the hopper.

In case the machine is desired for sowing clover or grass seed this can be effected by means of the hopper M, secured to the frame A behind the hopper L. This hopper L is provided with small holes $m$, and closely above the bottom of the hopper a revolving shaft, $j$, is suitably hung, and on the outer end of this shaft a pinion, J', is applied and made to mesh with the wheel J.

Operation: The cultivator is run over the field of young grain-plants with its wheels B B' between the drill-rows, and with the revolving pointed cutter-wheels and the cultivator blades and shields also between the drill-rows of plants. The desired depth at which the cultivation is to be performed is regulated by turning the windlass. As the machine moves along, the wheels F revolve and pierce the ground, and thereby prepare it for the action of the cultivator-blades following behind. The cultivator-blades turn up the partially-divided soil in smaller lumps or clods than is the case when not used in combination with the revolving cutter-wheels. The shields prevent the spreading of the cut-up soil upon the drill-rows of plants, and thus injury to the plants is prevented.

In broadcast sowing the clover or grass seed passes through the holes $m$ to the ground, and is covered by the revolving cutter-wheels and cultivator-blades; and in sowing the fertilizer it may be desirable to attach tubes for receiving the fertilizer and conducting it about the growing plants.

The cultivator, with the shields removed or elevated, is useful for preparing fields for planting grain and seed; but its special use is for treating growing grain-crops, and it is proposed to run the cultivator between the drill-rows of plants several times during a season, or until the plants have attained a height which will insure a full crop at harvest.

What I claim is—

1. In a grain-plant cultivator, the combination of the wheeled frame A and a series of vertically-swinging independent frames, D, each frame D having a series of loosely-turning pointed cutter-wheels, F, and cultivator-blades E, substantially as and for the purpose set forth.

2. The combination, with the wheeled frame A, of the independent frames D, having the wheels F and blades E, and the vertically-swinging arms $i^1$, carrying either shields or rakes, substantially as and for the purpose described.

3. The combination of the cultivator-blades E, revolving pointed cutter-wheels F, and the pendulous frame D, carrying the blades E and wheels F, substantially as described.

4. The combination of the seed-hopper M, frame A, and frames D, having blades E and wheels F, substantially as and for the purpose described.

5. The combination of the seed-hopper M and fertilizer-hopper L, provided with the cone-wheels $l$, inclined spouts $l^1$, and adjustable shaft $k$, the revolving pointed cutter-wheels F, cultivator-blades E, and frames D, substantially as and for the purpose described.

6. The vertically-swinging shields I, applied in pairs, in combination with the vertically-swinging frames D, having the blades E and wheels F, substantially as and for the purpose described.

WM. HENIGST.

Witnesses:
 ADOLF THEOBALD,
 WILLIAM RICHES.